(12) United States Patent
Mitchell et al.

(10) Patent No.: US 10,351,249 B2
(45) Date of Patent: Jul. 16, 2019

(54) PARACHUTE DEPLOYMENT APPARATUS, SYSTEM AND METHOD OF USE

(71) Applicant: Altus IP Limited, Hamilton (NZ)

(72) Inventors: Shaun Gordon Mitchell, Hamilton (NZ); Ryan Harley Cadwallader, Hamilton (NZ)

(73) Assignee: ALTUS IP LIMITED, Hamilton (NZ)

( * ) Notice: Subject to any disclaimer, the term of this patent is extended or adjusted under 35 U.S.C. 154(b) by 0 days.

(21) Appl. No.: 14/847,332

(22) Filed: Sep. 8, 2015

(65) Prior Publication Data

US 2017/0066537 A1    Mar. 9, 2017

(51) Int. Cl.
| B64D 17/80 | (2006.01) |
| B64D 17/72 | (2006.01) |
| B64C 39/02 | (2006.01) |

(52) U.S. Cl.
CPC ............ B64D 17/80 (2013.01); B64C 39/024 (2013.01); B64D 17/72 (2013.01); B64C 2201/027 (2013.01); B64C 2201/108 (2013.01); B64C 2201/185 (2013.01)

(58) Field of Classification Search
CPC ........ B64D 17/62; B64D 17/72; B64D 17/80; B64C 2201/185
See application file for complete search history.

(56) References Cited

U.S. PATENT DOCUMENTS

| 1,826,245 | A | * | 10/1931 | Hammerle | B64D 17/72 244/146 |
| 2,707,605 | A | * | 5/1955 | Sieverts | B64D 17/54 222/5 |
| 2,778,599 | A | * | 1/1957 | Paul, Jr. | B64D 17/72 244/146 |
| 3,283,406 | A | * | 11/1966 | Varin | B64D 17/58 244/150 |
| 4,607,814 | A | * | 8/1986 | Popov | B64C 31/0285 102/206 |
| 4,709,885 | A | * | 12/1987 | Martin | B64D 17/72 244/122 AF |
| 5,388,786 | A | * | 2/1995 | Hirose | B64D 17/72 182/3 |
| 5,887,825 | A | * | 3/1999 | Noel | B64D 17/72 244/147 |
| 7,819,714 | B2 | * | 10/2010 | Medford | B63C 9/18 441/95 |
| 2009/0098784 | A1 | * | 4/2009 | Medford | B63C 9/18 441/95 |
| 2015/0314881 | A1 | * | 11/2015 | Tsaliah | B64D 17/72 244/146 |

* cited by examiner

*Primary Examiner* — Joseph W Sanderson
(74) *Attorney, Agent, or Firm* — Pilloff & Passino LLP; Martin J. Cosenza

(57) ABSTRACT

A parachute deployment apparatus for use with an aircraft, including a deployment body with an internal cavity, the deployment body configured to house a parachute to be deployed through an upper opening of the internal cavity, a firing mechanism configured to release a pressurized gas into the internal cavity of the deployment body, wherein the apparatus includes a cap that engages with the upper opening to close it prior to deployment and is configured to be projected from the upper opening upon release of the pressurized gas into the internal cavity of the deployment body, and wherein the cap is connected to the parachute.

14 Claims, 8 Drawing Sheets

PARACHUTE DEPLOYMENT APPARATUS, SYSTEM AND METHOD OF USE

TECHNICAL FIELD

The present disclosure relates to improvements in the field of aircraft safety and emergency parachute systems.

BACKGROUND OF THE DISCLOSURE

Unmanned aerial vehicles (UAVs), commonly known as drones, are aircrafts without a human pilots on board. Over the past few decades, there has been significant research and development of UAVs, particularly with multi-rotor based UAVs. This has led to entirely new commercial markets for multi-rotor UAVs for a wide range of commercial applications beyond recreational/hobby use, including industrial surveying, construction, mining, stockpiling, photogrammetry, aerial photography, cinematography and video, live streaming, newsgathering, multispectral analysis for vegetation, security and surveillance, asset inspection, transmission and pipeline inspection. It is very likely that in future, and with further development of multi-rotor UAVs, new commercial uses will emerge.

Despite this rapidly growing industry for multi-rotor UAV technology and the promise it holds, there still remains some important obstacles which need to be better addressed. In particular, safety to people and property remains of utmost importance.

For instance, high winds, malfunction or one or more rotors, shaking, loss of communication with the automation control or battery failure may lead to situations where the UAV loses control and may crash-land, often at an uncontrolled descent. This poses a significant risk to people and property who may be positioned under the UAV.

This is a major concern for governmental agencies, which in the USA has led to substantial regulations at the Federal Aviation Administration (FAA) around control and use of UAVs under 55 pounds (24 kg). In early 2015, restrictions imposed on use users include weight restrictions, allowed hours of flight, visual line of sight operation, height restrictions, operator certification, aircraft registration and so forth.

Beyond safety concerns, highly sophisticated UAV systems are now being developed for important commercial operations, and the technology in the UAV hardware and/or its payload can often be very valuable. It will be important to develop systems to avoid damage to this technology during an uncontrolled crash-landing. In order to alleviate these risks and to enable viable commercial use of these UAVs on a large scale, further safety measures are in urgent need.

One mechanism which has been investigated in recent years to address these safety concerns is to mount a parachute system onto multi-rotor UAVs. Then, if the UAV or user loses control, a manual or automated parachute system could deploy a parachute to allow a controlled or semi-controlled descent of the UAV to avoid injury to people, property and/or the UAV itself.

Yet, the products that have been developed thus far have been problematic with regard to at least one of: slow deployment time; slow parachute catch once deployed; requires explosives or spring systems for deployment, or complicated power systems; non-automation; addition of significant weight to the UAV which becomes a burden on flight time; non-reliability due to false triggers; unintentional exhaustion of the firing mechanism before use; and/or component(s) and/or system not being re-usable.

At least some embodiments of the teachings detailed herein address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and some utilitarian features of the present disclosure will become apparent from the ensuing description which is given by way of example only.

SUMMARY OF THE DISCLOSURE

According to one aspect of the present disclosure there is provided a parachute deployment apparatus for use with an aircraft, the apparatus comprising: a deployment body with an internal cavity, the deployment body configured to house a parachute to be deployed through an upper opening of the internal cavity; a firing mechanism configured to release a pressurized gas into the internal cavity of the deployment body, wherein the apparatus comprises a cap that engages with the upper opening to close it prior to deployment and is configured to be projected from the upper opening upon release of the pressurized gas into the internal cavity of the deployment body, and wherein the cap is connected to the parachute.

According to a further aspect of the present disclosure there is provided a parachute deployment apparatus for use with an aircraft, the apparatus including: a deployment body with an internal cavity, the deployment body configured to house a parachute to be deployed through an upper opening of the internal cavity; a firing mechanism configured to release a pressurized gas into the internal cavity of the deployment body, the deployment body having a base portion which houses a channel in a centralised position on the base portion, wherein the channel, or a connector-channel within the channel, has a diameter between about 1 to 5 mm.

According to a further aspect of the present disclosure there is provided a parachute deployment system comprising a parachute deployment apparatus as herein described, and a controller configured to: determine the occurrence of pre-defined conditions; and activating the firing mechanism of the parachute deployment apparatus.

According to a further aspect of the present disclosure there is provided an aircraft attached with at least one parachute deployment apparatus and/or system as herein described.

According to a further aspect of the present disclosure there is a firing mechanism for use in the present disclosure, comprising a gas canister for provision of a pressured gas to a deployment body of a parachute deployment apparatus, configured to puncture the gas canister on determining at least one pre-defined condition being met.

According to a further aspect of the present disclosure there is a firing mechanism for use in the present disclosure, comprising: an activation means configured to drive movement of a piercing system once activated; a trigger releasably engaged with the piercing system, wherein the trigger is configured to release engagement with the piercing system to allow the activation means to drive movement of the piercing system once the engagement is released, and wherein the piercing system is configured to puncture a gas canister holding a pressurized gas when the piercing system is released from engagement with the trigger; a means to direct gas released from the gas canister into a deployment body of a parachute deployment apparatus; and an actuator which is configured to receive a signal indicating a pre-defined condition has been met, and which is configured to cause the trigger to be released from engagement with the piercing system.

According to a further aspect of the present disclosure there is provided a method of deployment of a parachute deployment system as described herein on an aircraft, wherein the method of deployment comprises: determining at least one pre-determined condition being met; and controlling the firing mechanism to initiate deployment of the parachute from the parachute deployment apparatus.

According to a further aspect of the present disclosure there is provided a method of deployment of a parachute deployment apparatus as described herein on an aircraft, wherein the method of deployment comprises: pre-defining one or more conditions, which if one or more conditions is met, initiates release of the trigger; prior to launch of the aircraft, engaging the trigger to be releasable from the piercing system upon the one or more pre-defined condition being met during flight of the aircraft; upon a pre-defined condition being met, automatically releasing the trigger from the piercing system to initiate deployment of the parachute from the parachute deployment apparatus.

According to a further aspect of the present disclosure there is provided a method of UAV aircraft flight, wherein the aircraft comprises a parachute deployment system as herein described, wherein the method of flight comprises:
  a) preventing substantial lateral movement of aircraft during the initial 8 meters of vertical ascent from a take-off position and/or
  b) preventing substantial lateral movement of aircraft during the final 8 meters of vertical descent to a landing position.

As will be elaborated on in more detail below, exemplary embodiments of the parachute deployment apparatus and associated firing mechanism described here may be utilitarian in that they may allow very fast deployment and catch of the parachute which means that the aircraft has the ability to safely operate at very low levels above the ground whilst still having time to quickly and reliably deploy the parachute on one or more pre-defined condition being met. This may be useful for the protection of people, property on the ground, and the aircraft/its payload. Furthermore, the system may not be reliant on explosives, springs or dog collar type parachutes to quickly deploy or open the parachute for a full catch. Additionally, the systems are configured to be fully automated, such that human error can be taken out of the equation. The system may also be re-usable, by simply re-charging the firing mechanism, and re-inserting the parachute into the deployment body for subsequent flights if the parachute had been deployed.

Throughout this specification, the term aircraft should be taken as meaning any manned or un-manned vehicle intended for airflight. In an exemplary embodiment, the aircraft may be an unmanned aircraft. It is envisaged that the parachute technology may be particularly applicable for un-manned aircraft vehicles (UAVs) given the safety problems faced in this industry as discussed previously.

For example, the unmanned aircraft may be a multi-rotor UAV. Multi-rotor UAVs may suffer from safety concerns arising from rollovers, uncontrollable shaking, human error with aircraft control, or complete power failure. However, it should be appreciated that the parachute deployment apparatus may also be applicable for manned aircrafts in some situations, and this should not be considered beyond the scope of the disclosure. For instance, the ability to quickly deploy parachutes, albeit at a much larger scale, is also an important feature for low flying aircraft.

In an exemplary embodiment the parachute deployment apparatus may be used as a drogue deployment body for a larger main parachute—for example in place of a rocket powered leader as known in prior art systems.

Throughout this specification, the term deployment body should be taken as meaning a tube like structure which houses the parachute prior to deployment. In use, the system may be attached to a multi-rotor UAV such that the deployment body is directed upwards and above the height of the rotors, such that the parachute, when deployed, will project upwards into the sky and away from the rotors or other components on the UAV.

Throughout the specification the term internal cavity should be taken as meaning the space within the deployment body.

In an exemplary embodiment, the internal cavity of the deployment body may be substantially cylindrical in shape. It is envisaged that this shape may be utilitarian because it avoids any edges or corners that may prevent or slow down the deployment process. The body may be made of a wide range of materials, although such materials should be hardy, light weight, and have smooth surfaces—for example as may be achieved using carbon fibre.

In an exemplary embodiment, the internal cavity of the deployment body may have an internal diameter of between 20 to 150 mm. This range has been identified by the inventors to assist in the expulsion process of the parachute.

In an exemplary embodiment the internal cavity of the deployment body may have an internal diameter of about 50 mm.

In an exemplary embodiment, the internal cavity of the deployment body may be elongate. This may help to aim the parachute in a specific direction during the deployment process, contributing to achieving quick deployment and catch. Additionally, the elongate length may help to elongate the actual parachute from a compacted state near the base portion of the deployment body when it is progressing through the cavity during the deployment process. Again, this may aid the deployment speed of the parachute and avoid the parachute simply deploying in a crumpled state, which would take longer to deploy and limit the ability to achieve a full catch of the parachute. When used in association with the cap (which is attached to the parachute), the speed of deployment and/or catch effects may be beneficially accentuated, as the cap also aids the elongation and/or stretching process of the parachute as it is deployed from the deployment body.

In an exemplary embodiment, the cavity of the deployment body may have an elongate length at least four times the diameter of the cavity. The inventors have identified this may assist with the expulsion of the parachute efficiently out of the deployment body. Additionally, it may be beneficial to achieving the intended directional expulsion, which is often not seen in passive deployment systems. Also, having a sufficiently long length relative to the diameter of the deployment body may help to ensure the parachute, once deployed, is well clear of any rotors.

In an exemplary embodiment, the cavity of the deployment body may have an elongate length of between 150 mm-500 mm. In another exemplary embodiment, the cavity of the deployment body may have an elongate length of about 300 mm. In tests, this range was found to be most ideal to achieve the benefits discussed above with regards to the elongate length, and within this range, 300 mm was found to be provide the best results.

In an exemplary embodiment, the internal cavity of the deployment body may have: an elongate length of about 300 mm; a diameter of the internal cavity of about 50 mm; and a circumference of the internal cavity of about 160 mm. In the context of a UAV, these dimensions are seen to be sufficiently large to house the parachute in a compacted state at the base portion, and provide an elongate passageway for the parachute to extend through during deployment. As noted previously, the utilitarian elongate shape may allow accurate directional firing, and also aid stretching of the parachute as it travels through the cavity.

Throughout this specification, the term parachute should be taken as meaning a canopy which is able to be deployed from the aircraft when required, and to fill with air to allow the aircraft to descend at a slower speed than without the parachute.

The parachute may be connected to the aircraft using one or more parachute harness points fixed to the top surface of the aircraft. For instance, a parachute may be attached to a plurality of suspension lines, which then come together at a point and connect to a cable. That cable may then extend to the top surface of the aircraft. In use, the plurality of suspension lines may be first packed into the deployment body, followed by the parachute. The cable may then extend up through the deployment body and out through the upper opening and then down to the top surface of the aircraft where it may be attached via a harness point.

Throughout the specification, the term upper opening should be taken as meaning the mouth, orifice or similar of the cavity of the deployment body which enables the parachute to project out of when the firing mechanism occurs.

In an exemplary embodiment, the upper opening may be approximately the same circumference as the internal cavity of the deployment body. This is seen as assisting with smooth and fast projection of the parachute out of the deployment body during deployment.

Throughout the specification the term cap should be understood to mean a bung, lid, stop, cork, seal cover, or the like which is intended to frictionally engage in or across the upper opening such that the cap remains in place during flight, but as a result of activation of the firing mechanism of the parachute deployment system, the sudden pressure buildup in the internal cavity is sufficient to forcibly project the cap off the deployment body at significant velocity, much like a child's pop-gun.

In exemplary embodiments the cap may be connected directly or indirectly to the parachute. The cap may be connected to a leader string, wherein the other end of the string is connected to the apex of the parachute. As a result, when the cap is forced out at high velocity, it pulls and quickly elongates the parachute as it travels through the deployment body and out into the open air. This feature can have utility in that it substantially and surprisingly helps to provide fast deployment out of the deployment body, and also helps to stretch out the parachute quickly such that it may quickly fill with air and slow the fall of the aircraft as it approaches the ground.

Prior art parachutes used for multi-rotor UAVs which can take considerable time to deploy and take the full weight of the aircraft. The present disclosure may dramatically improve deployment time by reducing the time to achieve this effect to within 1.7 seconds from when the firing mechanism is initiated. This means a safe "catch" may be achieved from as low as 8 meters (26 feet) above the ground. The cap is one of the features that is considered to significantly improve the response time.

In an exemplary embodiment, the cap may weigh between about 10 to 50 grams. This weight range may be utilitarian because it provides sufficient energy to help pull and elongate the parachute as it is also being pushed out from the deployment body. However, there may be a detrimental effect to increasing the weight substantially beyond this range, as it may hinder overall weight of the deployment system, which negatively impacts on the UAV flight efficiency. As the cap is configured travel at a faster pace than the parachute that is being ejected out of the deployment body which is less aerodynamic, the pulling effect may be well understood. In an exemplary embodiment the cap may weigh about 35 grams.

It should be appreciated that the cap may be made of any suitable material, but in an exemplary embodiment may be made of acetal plastic. Acetal plastic may be particularly suitable because it is dense and carries substantive weight, and also is not prone to breakage. It also may allow an airtight seal to form at the upper opening, yet may be disengaged from the upper opening by sufficient pressurized gas forced on it as a result of the firing mechanism.

In an exemplary embodiment, the cap may comprise at least one O ring radially extending around its outer perimeter. The O ring may be have utilitarian value in that it can help engage with the inner walls of the deployment body near the upper opening, to provide a seal and provide friction for the cap, to build up pressure resistance during the firing mechanism. The O ring ideally is made of rubber.

In an exemplary embodiment, the cap may comprise a channel located along one part of its perimeter. This may allow a parachute cable, which is connected to a top surface of the aircraft, to then extend into the deployment body and connect to the shroud/suspension lines even when the cap is in place on the upper opening. Then, when the cap and the parachute are deployed, the cable will also be free to extend out from the deployment body completely, such that after full deployment the cable is no longer in the deployment body, and instead may extend directly up to the opened parachute from the top surface of the aircraft.

Throughout the specification, reference to the base portion should be understood as the bottom wall or floor of the deployment body. The base portion may be integrally built in as part of the deployment body, or it may be a removable component, such as a disk shaped bung that securely engages with a lower internal rim of the body. In some embodiments, this latter option can have utility in the relative ease of separation if required to allow for maintenance, replacement or cleaning of the base portion or deployment body.

In an exemplary embodiment, the base portion may comprise a conical surface facing the internal cavity of the deployment body. The conical surface may assist to direct the force from the pressurized gas to the whole parachute in an upwards fashion. The inventors experimented with a number of base portion shapes, and the conical shape was identified to produce the most effective propulsion of the parachute in testing.

In an exemplary embodiment, the channel between the source of pressurized gas and the internal cavity may be located in a centralized portion of the conical surfaced base portion, and extend through the base portion. Therefore, in this embodiment, the base portion may be better defined having a frusto-conical surface, due to the channel which exposes itself at the central part of the base portion's surface. Alternatively, the whole base portion may be seen as a ring with inward tapering on one surface, given the channel forms through the base portion.

Throughout the specification the term channel should be taken as meaning an aperture, path, hole, or passage which allows ingress of pressurized gas from the firing mechanism into the internal cavity of the deployment body.

In an exemplary embodiment, the channel may be configured to house a deployment manifold.

In an exemplary embodiment the deployment manifold may comprise a connector-channel. This connector-channel may provide a dedicated pathway for the pressurized air to travel through from the firing mechanism (for instance from within the valve block, which should be air tight), into the internal cavity of the deployment body via the channel in the base portion.

In an exemplary embodiment, the connector-channel may comprise at least one manifold port. The connector-channel may comprise a plurality of manifold ports. These manifold ports help to allow efficient inflow of pressurized gas into the connector-channel from within the valve block. The connector-channel in the deployment manifold may therefore serve as the channel according to the present disclosure to provide the pressurized gas into the internal cavity of the deployment body. Additionally, the deployment manifold may be easily replaceable and removed for cleaning if required.

In an exemplary embodiment, the channel, and/or the connector-channel of the deployment manifold, may have a diameter of between about 1 to 5 mm. After considerable experimentation, utilitarian dimensions of the channel (or connector channel within) were found to be useful in enabling the necessary force on, and ultimately the velocity of, the parachute upwards when the gas is released into the internal cavity of the deployment body. In working outside this range, the inventors saw too little flow or too much flow to the internal cavity. Both scenarios resulted in ineffective deployment of the parachute in that it did not have the velocity to stretch the parachute out correctly and quickly. Furthermore, the inventors wanted to utilise a small gas canister to avoid unwanted weight on the aircraft. Therefore, the dimensions of the channel or connector channel needed to work with the limitation of the lower amounts of gas pressure reserves, and find a way to use the available gas as efficiently as possible.

In some embodiments, the channel, or the connector-channel of the deployment manifold, may have a diameter of about 2.4 mm. This diameter of the channel/connector channel was found to provide the most optimal force applied to the parachute within the deployment body. This configuration is seen as differing from most parachute deployment apparatuses used for miniature aircrafts, which typically use passive deployment systems. Typically, these system only get the parachute out, i.e. they "flop out" and rely on the dropping speed of the airframe to create the momentum to open the parachute. This is very different to the present disclosure which quickly deploys and/or stretches the parachute, so that the descending speed very quickly opens the parachute creating the efficiency observed with deployment and catch of the parachute.

It should be appreciated that the parachute deployment apparatus according to the present disclosure may utilise any known or existing firing mechanisms which are able to cause projection of pressurized gas into the internal cavity of the deployment body.

However, the inventors have developed a firing mechanism which they consider is an improvement over existing firing mechanisms. Some exemplary utilitarian features can be that the mechanism is designed such that: it may use standard, gas canisters which are lightweight, inexpensive, reliable and easy to exchange in the system for re-loading; requires no explosive; and/or the gas canister is only punctured as a result of the firing mechanism being activated (whereas previous technology requires pre-puncturing, which is problematic due to potential gas leaks and hence failure prior to use).

Throughout this specification, the term pre-defined condition for should be understood to mean any event which is considered by a programmer or user to indicate the aircraft is in danger of losing power, losing control, losing altitude or so forth which may cause a safety concern to people, property, the aircraft and/or its payload.

In an exemplary embodiment, the pre-defined condition may be selected from the group consisting of substantial tilting of the aircraft, uncontrolled shaking of the aircraft, or power failure to the aircraft. These are the most common types of events that may lead to loss of control of the aircraft, which could be a safety concern to people below the aircraft, as well as property. However, it should be noted that any number or types of pre-conditions may be programmed into the controller, for instance depending on the particular use of the aircraft.

In an exemplary embodiment, the substantial tilting of the aircraft which defines a pre-defined condition is beyond about 70° tipping from a horizontal plane. Such tilting may occur to a wide range of events, for instance heavy winds, loss of rotor(s) function, damage to the aircraft itself, human error with aircraft control, or potential miscommunication with an automated or manual control means.

In an exemplary embodiment, the firing mechanism may comprise a valve block. The valve block may serve multiple functions, comprising acting as an attachment means for different components on the firing mechanism, and provision of an initial pathway for the pressurized gas to travel once released from the gas canister.

In an exemplary embodiment, the valve block may be sealed to be airtight. This helps to ensure that any pressurized gas that is released into the valve block is effectively transferred into subsequent components of the firing mechanism, i.e., in some embodiments, the deployment manifold.

Throughout the specification the terms activation means should be taken as meaning any component on the firing mechanism that may be first activated or set before flight of the aircraft, and then upon a pre-defined condition being met, the activation means is configured to be able to drive movement of the piercing system.

In an exemplary embodiment, the activation means may comprise a biasing means—for example, a spring. The spring may allow the activation means to be held under tension prior to flight, such that once the tension is released (for instance by releasing a trigger from the piercing system), the activation means drives forward to move the piercing system to drive forward too.

In an exemplary embodiment, the spring may be located within a spring housing which connects to the valve block. The spring housing may help to protect the spring, and also provide an engagement point with the valve block. One may better appreciate that in some embodiments, the firing mechanism and its components when assessing the examples in the best modes section.

In an exemplary embodiment, the activation means may comprise a spring connector rod that is connected to a spring system at a first end of the spring connector rod, and wherein the spring connector rod is configured to connect to and drive the hammer pin at the first end. For instance, the spring connector rod may be configured to tension the spring through the spring housing which is connected to the valve block, such that upon release of the trigger, the tensioned spring drives the spring connector rod to force movement of the piercing system.

The spring connector rod may comprise a knob mounted on its second end, which may allow a user to easily pull back on the knob to activate the activation means prior to flight. The spring connector rod is intended to be pulled back sufficiently to allow engagement of the trigger with a portion of the activation means or hammer pin, as will be discussed further below.

Throughout this specification, the phrase piercing system should be taken as meaning any component or number of components that work together to cause piercing of the gas pressure source (e.g. gas canister). In an exemplary embodiment the piercing system may comprise: a hammer pin, lug rocker arm, and/or firing pin.

Throughout the specification the term hammer pin should be taken as meaning a component in the piercing system that engages with the activation means.

In an exemplary embodiment, the hammer pin may comprise a groove configured to engage with a portion of the trigger. In this exemplary embodiment the trigger engages within the groove on the hammer pin to allow the activation means to first be activated before flight, and to prevent the driving force of the hammer pin until the trigger is disengaged with the hammer pin (upon a pre-defined condition being met). It should be appreciated that the piercing system may comprise alternative configurations, and the trigger may be configured to engage a different component in the piercing system other than the hammer pin.

In an exemplary embodiment, the hammer pin may be housed within a first cavity in the valve block, and is configured to slidably move within the first cavity. This embodiment not only allows protection of the hammer pin within the valve block, but also ensures movement of the hammer pin is restricted to a controlled linear fashion as a result of being driven by the activation means.

In an exemplary embodiment, the hammer pin may be configured to engage with a lug rocker arm. This lug rocker arm may be able to re-direct the force of the hammer pin onto the firing pin, which may be beneficial to help compact the different components of the piercing system, and to that effect, also the entire firing mechanism into a small area, which is ideal for flight. Essentially, the gas canister and activation means may then be retained in close proximity to one another, rather than the firing mechanism being stretched out.

In an exemplary embodiment, the lug rocker arm may be pivotable about an off-center fulcrum point. In this embodiment, the lug rocker arm may be pivotably connected to the valve block. In the context of utilizing a firing pin, the off-center fulcrum may then allow distribution of a relatively large movement of the hammer pin to one end of the lug rocker arm and to a smaller, yet more forceful movement of the other end of the lug rocker arm, which may be configured to forcibly drive the firing pin in the opposite direction to the hammer pin. Again, this change of direction aids in compacting the firing mechanism to a convenient size.

Throughout this specification the term firing pin should be taken as meaning any component which is configured to pierce, rupture or penetrate through a portion of a gas canister sufficient to allow release of pressurized gas retained within the gas canister.

In an exemplary embodiment, the firing pin may be housed within a firing cavity in the valve block, and is configured to slidably move within the firing cavity. As described with reference to the hammer pin, this embodiment may allow for protection of the firing pin, and also may help to ensure a controlled linear movement of the firing pin towards and away from a pre-defined position on the gas canister to be punctured by the firing pin.

In an exemplary embodiment, the firing pin may comprise a tip that is sufficiently pointed as to cause puncturing of a gas canister when required.

In an exemplary embodiment, the firing pin may comprise at least one aperture extending from its tip, allowing gas to travel through the tip.

In an exemplary embodiment, the firing pin also comprises at least one firing pin port configured to allow gas travelling from tip aperture to then be expelled into the valve block.

In an exemplary embodiment the firing pin may comprise a plurality of firing pin ports. These firing pin ports may efficiently allow transfer of pressurized gas from the firing pin into the valve block, at which point the transferred gas may then be efficiently taken in by the deployment manifold, through its inlet aperture(s). In some instances, there is utilitarian value in having multiple ports on the firing pin/deployment manifold because it can prevent a situation where rotation of the firing pin may unintentionally block a full gas charge being emitted via the deployment manifold and into the internal cavity of the deployment body.

Throughout the specification the term trigger should be taken as meaning a component which is configured to releasably engage with the piercing system, to result in the piercing system piercing the gas canister, for instance via a firing pin.

In an exemplary embodiment, the trigger may be under tension via a biasing means such as a retaining spring. This may help to lightly pull the trigger into a groove of the hammer pin. The groove may simply be a cutaway portion on the hammer pin that allows snug engagement and avoid accidental firing of the firing mechanism. As noted previously, the trigger may engage with an alternative part of the piercing system without departing from the scope of the disclosure.

In an exemplary embodiment, the trigger may be configured as a trigger arm which comprises a pivot portion at one end, and an engagement portion which is configured to engage with the groove on the hammer pin. In this embodiment, and as will be elaborated on further below with reference to an actuator, the trigger arm may pivot as a result of a force resulting from rotational action of the actuator, leading to the engagement portion of the trigger arm disengaging from the groove on the hammer pin.

The firing mechanism may rely on a standard gas canister, such as a standard 12 or 16 gram $CO_2$ gas cartridge. Of course, alternative pressurized gas or canisters may be used. Embodiments of the firing mechanism and parachute deployment apparatus as described herein have been specifically engineered to be able to work with these small, lightweight gas cartridges. This has made development of the systems more difficult because of the limited force generated by the gas within the cartridge.

In an exemplary embodiment, the gas canister may be configured to engage with the valve block. In this embodiment, the gas canister ideally is orientated in a position such that the hammer pin or firing pin directly engages with it upon action of the firing mechanism to pierce the gas canister.

In an exemplary embodiment, the gas canister engages with the valve block. For instance, the cap of the gas canister may be screwed into the bottom of the firing cavity such that the firing pin faces down the firing cavity and towards the cap of the gas canister and in position to be punctured.

In an exemplary embodiment, once the gas canister is pierced by the firing pin, the released gas may travel initially into the firing cavity of the valve block (which as one can imagine should be airtight), before being transferred into the internal cavity of the deployment body.

In an exemplary embodiment, the firing mechanism may comprise a deployment manifold which transfers pressurized gas from a part of the firing mechanism into the deployment body. In an exemplary embodiment the deployment manifold transfers pressurized gas from the firing cavity of the valve block into the internal cavity of the deployment body. In this embodiment the deployment manifold inserts into the channel of the deployment body's base portion. In this way, the connector-channel within the deployment manifold defines the diameter of the channel within the base portion of the deployment body. Therefore, as discussed previously, the connector-channel may be between 1 to 5 mm in diameter at the end which faces into the internal cavity of the deployment body.

In an exemplary embodiment one end of the deployment manifold may comprise a thread located on its outer surface, which may be configured to engage with the internal surface of the channel in the base portion of the deployment body.

Throughout this specification the term actuator should be taken as meaning any component that is responsible for moving or controlling a mechanism or system via an energy source, which then converts that energy into a desired motion. In more detail, the actuator may be configured to receive a signal indicating a pre-defined condition has been met, and which is configured to cause the trigger to be released from engagement with the piercing system.

In an exemplary embodiment, the actuator may be a rotary actuator. This may be utilitarian to retain the components of the firing mechanism relatively compact within a small space. For example, the rotary actuator may be configured to rotate a horn disc, which then subsequently is configured to disengage the trigger arm about its pivot point to an extent that it disengages with the piercing system.

In an exemplary embodiment, the rotary actuator may be a servomechanism (which may herein be referred to as a "servo"). A servomechanism is an automated device, which can receive sensing feedback (typically an electronic signal) which indicates a pre-defined condition, and then leads to a mechanical change in the firing mechanism, such as exemplified above to enable the firing mechanism to occur. The servomechanism may comprise a built-in encoder.

The various illustrative logical blocks, modules, circuits, and algorithm steps described in connection with the embodiments disclosed herein may be implemented as electronic hardware, computer software, or combinations of both. In particular, they may be implemented or performed with a general purpose processor such as a microprocessor, or any other suitable means known in the art designed to perform the functions described.

The steps of a method or algorithm and functions described in connection with the embodiments disclosed herein may be embodied directly in hardware, in a software module executed by a processor, or in a combination of the two. If implemented in software, the functions may be stored as processor readable instructions or code on a tangible, non transitory processor-readable medium—for example Random Access Memory (RAM), flash memory, Read Only Memory (ROM), hard disks, a removable disk such as a CD ROM, or any other suitable storage medium known to a person skilled in the art. A storage medium may be connected to the processor such that the processor can read information from, and write information to, the storage medium.

The details of one or more embodiments are set forth in the accompanying drawings and the description below. Other features and some utilities will become apparent from the description, the drawings, and the claims.

BRIEF DESCRIPTION OF THE DRAWINGS

Further aspects of the present disclosure will become apparent from the ensuing description which is given by way of example only and with reference to the accompanying drawings in which.

DETAILED DESCRIPTION

Figure 1:
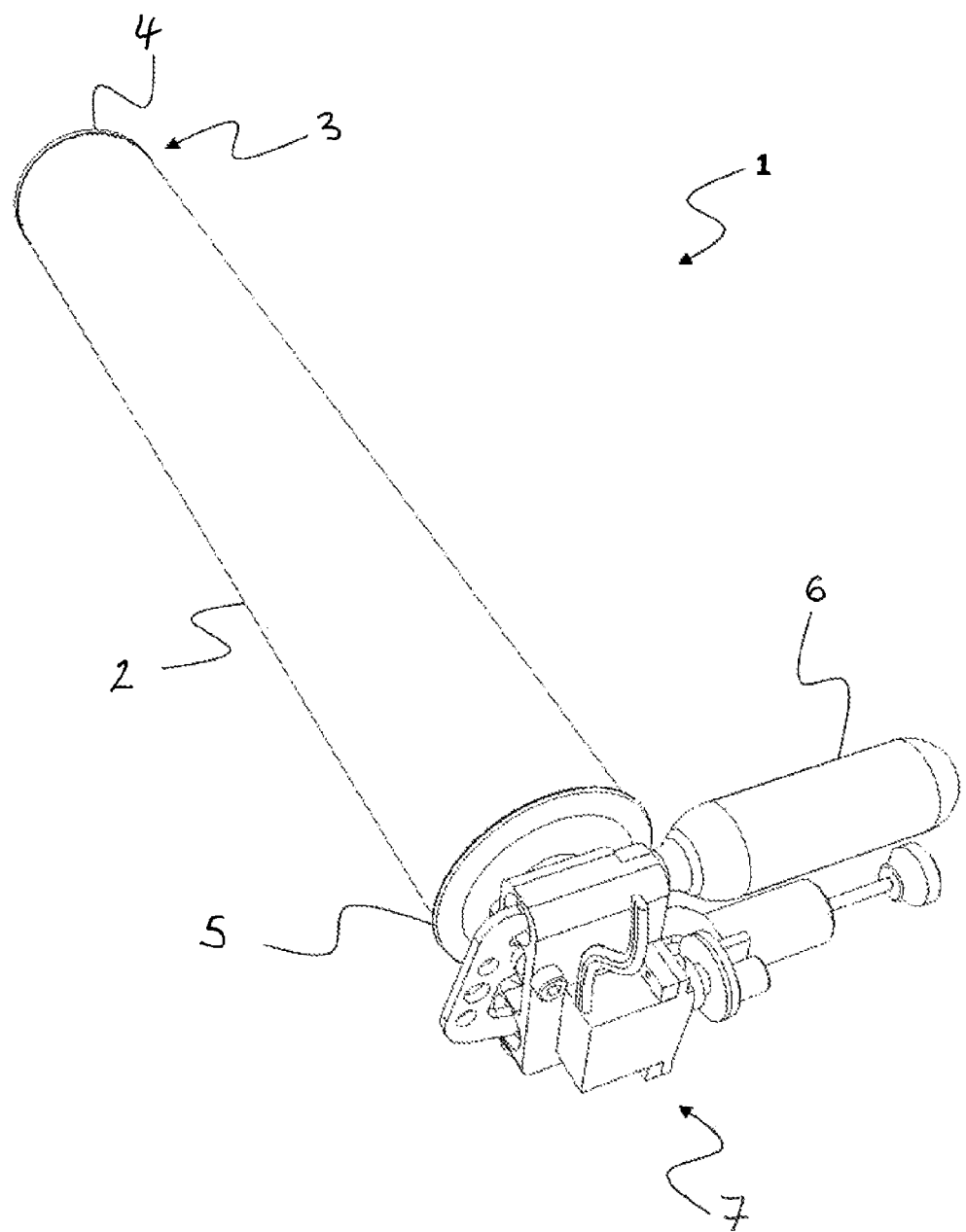
FIG. 1 is a perspective view of an exemplary parachute deployment apparatus according to an aspect of the disclosure.

FIG. 1 shows a parachute deployment apparatus—labelled generally as (1). The apparatus (1) comprises a cylindrical deployment body (2) made of carbon fibre, and having an internal cavity (not illustrated in FIG. 1, but which may be seen in FIG. 3A). The deployment body (2) is 300 mm in length, with its internal cavity having a diameter of 50 mm and 160 mm circumference.

At one end, the deployment body (2) comprises an upper opening (3), covered by a deployable cap (4). The other end of the deployment body (2) has a base portion in the form of a disk shaped bung (5). The internal cavity of the deployment body (2) is fluidly connected to a $CO_2$ gas canister (6) via the bung (5) and a firing mechanism (7).

Figure 2:
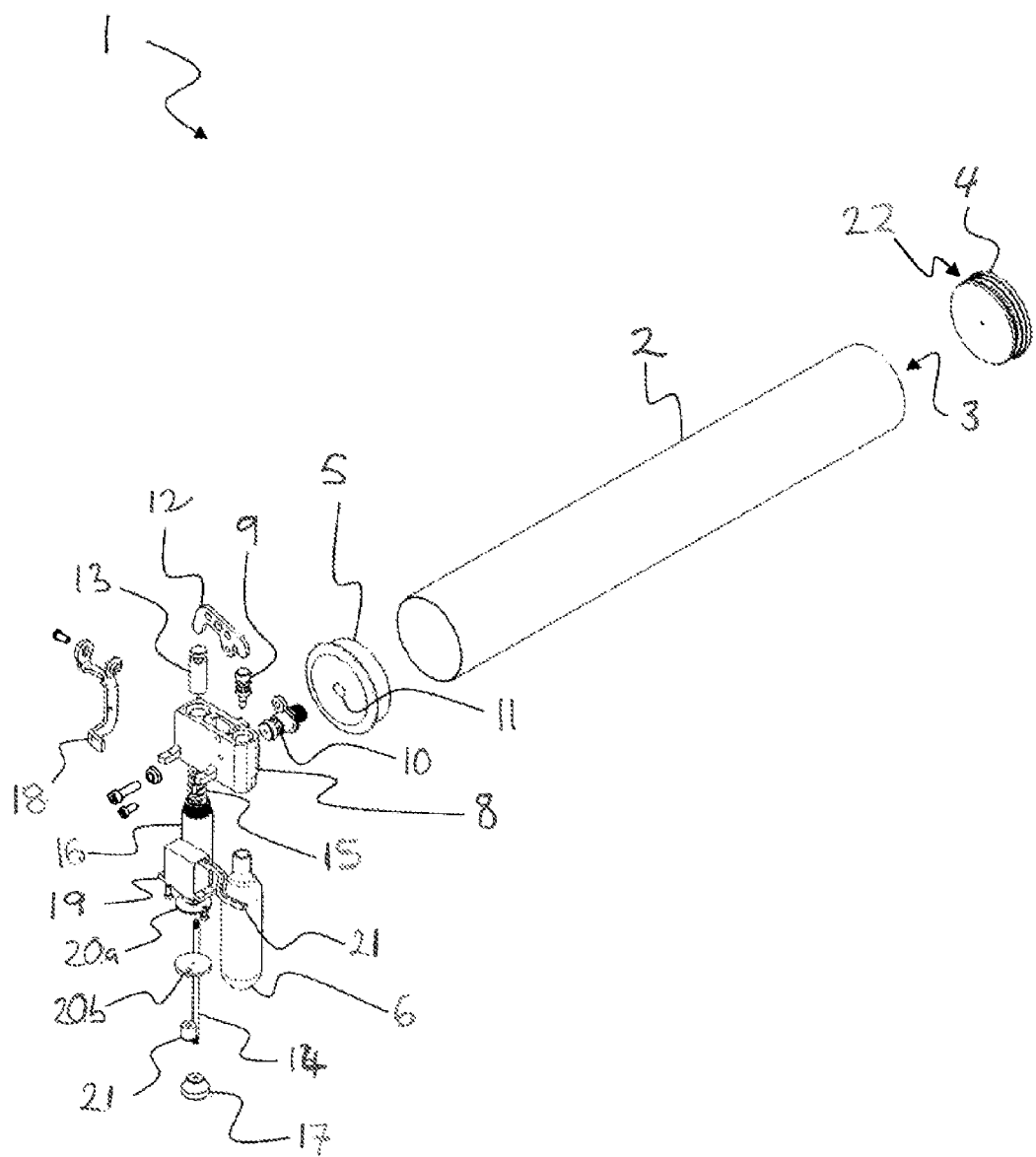
FIG. 2 is an exploded view of the parachute deployment apparatus.

Referring to FIG. 2, the firing mechanism (7) comprises a valve block (8) to which the gas canister (6) is engaged, the valve block (8) housing a firing pin (9) for piercing a seal of the gas canister (6) and delivering pressurized gas through a deployment manifold (10)—also housed by the valve block (8)—to the internal cavity via an aperture (11) in the bung (5) in which the deployment manifold (10) is positioned.

The firing mechanism (7) also comprises a lug rocker arm (12), driven by a hammer pin (13) housed by the valve block (8) to act against the firing pin (9). The hammer pin (13) is in engagement with an activation means, comprising a spring connector rod (14) biased towards the lug rocker arm (12) by a spring (15) contained in a spring housing (16). A knob (17) is secured to an end of the spring connector rod (14) distal from the hammer pin (13), for manually drawing the rod (14) against the bias of the spring (15) to engage the hammer pin (13) with a trigger arm (18).

The firing mechanism (7) also comprises a rotary actuator in the form of servomechanism (19), configured to rotate a two part horn disc (20a and 20b) to cause a bearing spacer (21) to act against the trigger arm (18) to overcome the bias of a retaining spring (not shown) in order to release the hammer pin (13)—as will be discussed further below. A wired connection (21) is provided for receiving trigger signals for activation of the servomechanism (19).

The cap (4) seals against the body (2) using an O-ring (22). On release of gas from the canister (6), pressure builds within the cavity in the body (2) until the cap (4) is ejected.

Figure 3A:
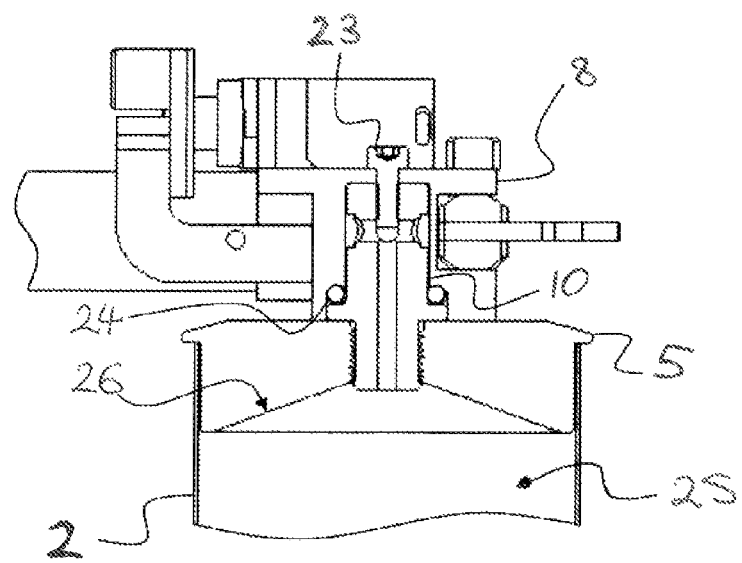
FIG. 3A is a cross-sectional view of a first end of the exemplary parachute deployment apparatus.

Referring to FIG. 3A, the deployment manifold (10) is secured to the valve block (8) using a fastener such as a bolt (23), seated against an O-ring (24) to seal the cavity in the block (8) in which the deployment manifold (10) is positioned. The end of the deployment manifold (10) distal from the fastener (23) is secured to the aperture (11) in the bung (5), opening into the internal cavity (25) of the body (2). The cavity facing surface (26) of the bung (5) is frusto-conical in shape, and is the surface against which a parachute is packed in anticipation of deployment, as will be described further below.

Figure 3B:
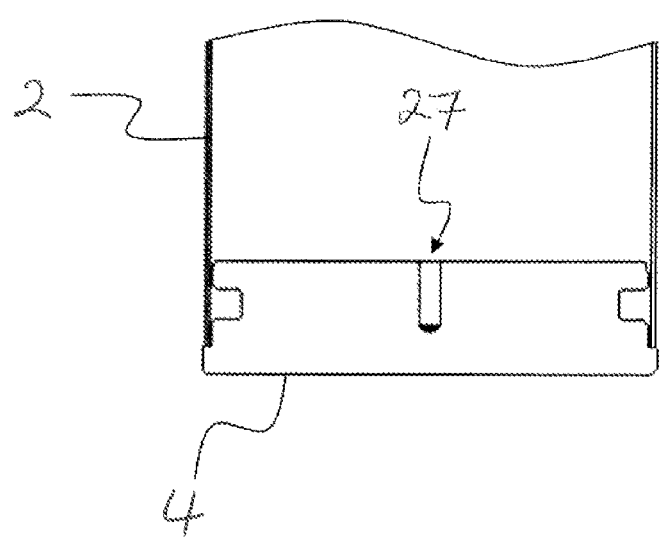
FIG. 3B is a cross-sectional view of the second end of the exemplary parachute deployment apparatus.

FIG. 3B shows the open end of the body (2)—albeit closed off by the cap (4). The internal surface of the cap (4) comprises a leader string connection point (27), use of which will be described further below with reference to FIG. 9.

Figure 4:
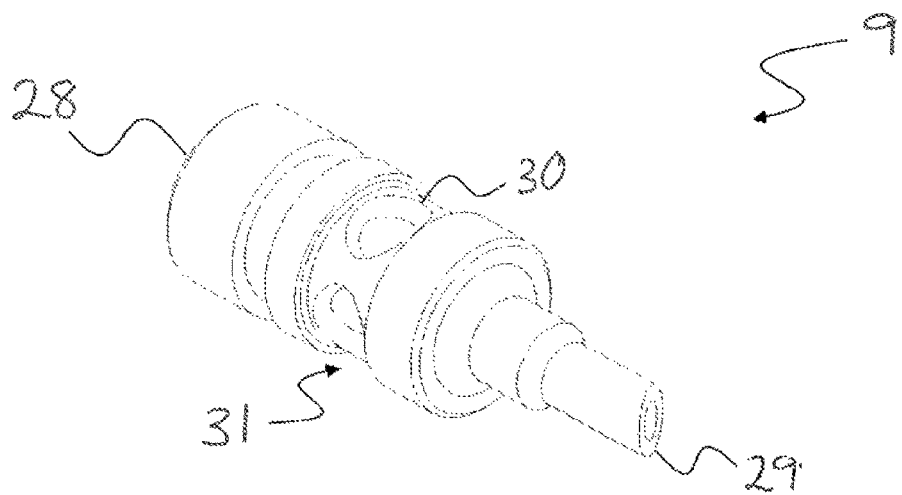
FIG. 4 is a perspective view of a firing pin of the exemplary parachute deployment apparatus.

As seen in FIG. 4, the firing pin (9) comprises a firing pin body (28), having a hollow sharp tip (29) at one end. The sharp tip (29) connects to firing pin ports (30) arranged annularly about the firing pin body (28). The firing pin ports (30) are located within an annular recess (31) in the side of the body (28), which provides a fluid pathway in combination with the valve block (8) to direct the flow of gas from the gas canister (6).

Figure 5:
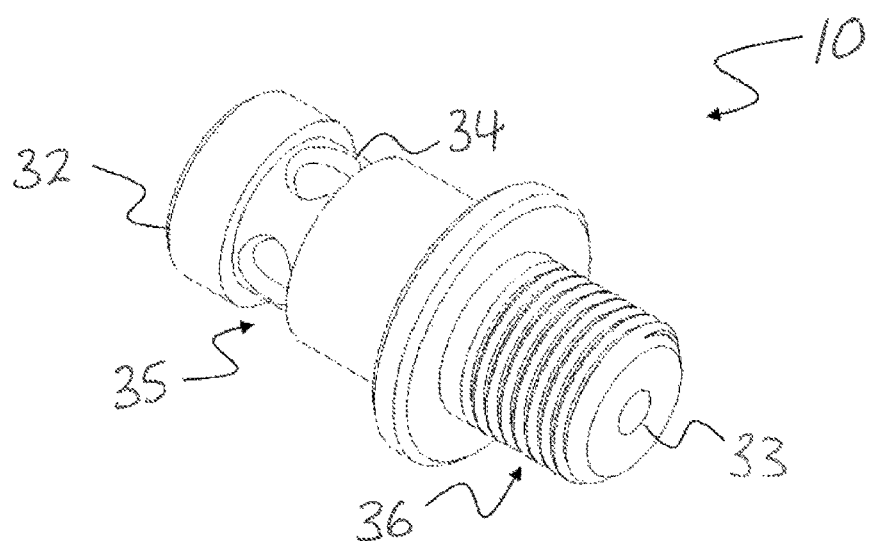
FIG. 5 is a perspective view of a deployment manifold of the exemplary parachute deployment apparatus.

Similarly, as seen in FIG. 5, the deployment manifold (10) comprises a manifold body (32) having a connector channel (33) passing from a first end of the body (32) through to annularly arranged manifold ports (34) within a recess (35). Connector channel (33) has a diameter of 2.4 mm, and in use opens into the internal cavity (25) of the body (2)—the deployment manifold (10) being secured to the aperture (11) in the bung (5) by external threads (36) complementary to threads in the aperture (11).

Figure 6:
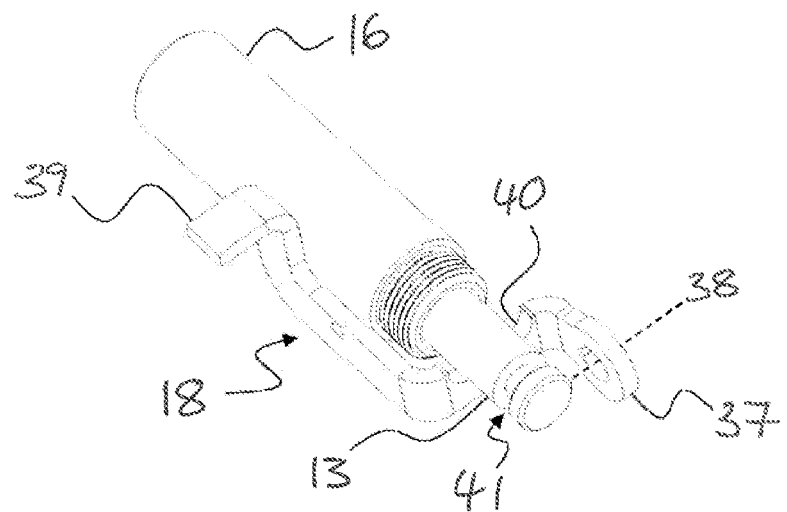
FIG. 6 is a perspective view of a hammer pin and its interaction with a trigger arm of the exemplary parachute deployment apparatus.

FIG. 6 shows interaction of the hammer pin (13) and the trigger arm (18). The trigger arm (18) pivots at a first end (37) about a pivot axis (38), on being driven by the bearing spacer (21) of the servomechanism (19)—not shown in FIG. 6—against trigger arm tab (39). When primed, or armed, a lateral engagement portion (40) engages a groove (41) of the hammer pin (13) to prevent slidable movement thereof. Pivoting of the trigger arm (18) drops the lateral engagement portion (40) out of the groove (41), allowing the spring (15) within the spring housing (16) to drive the hammer pin (13) forward.

Figure 7:
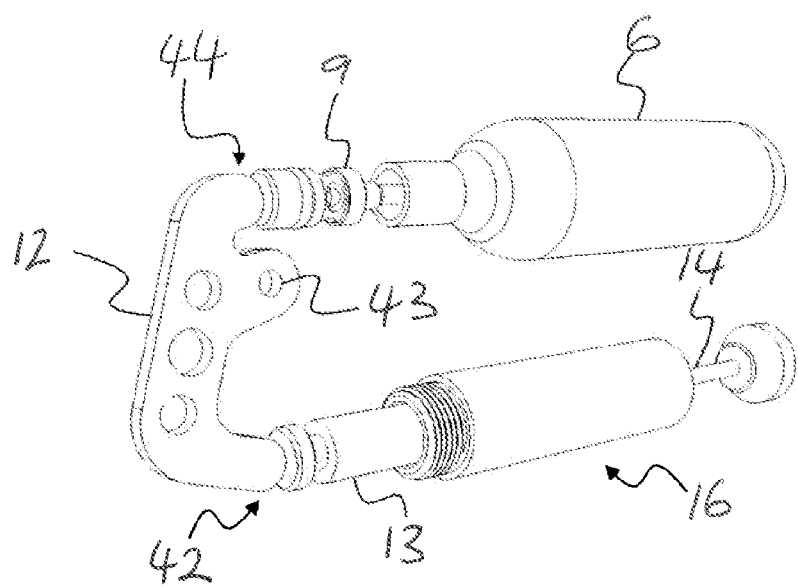
FIG. 7 is a perspective view of the hammer pin, a lug rocker arm, and the firing pin in use with a gas canister of the exemplary parachute deployment apparatus.

With reference to FIG. 7, the hammer pin (13) is driven into contact with a first end (42) of the lug rocker arm (12), which pivots about its off center fulcrum point (43). The second end (44) of the lug rocker arm (12) in turn depresses the firing pin (9) to pierce a seal of the gas canister (6).

Figure 8:
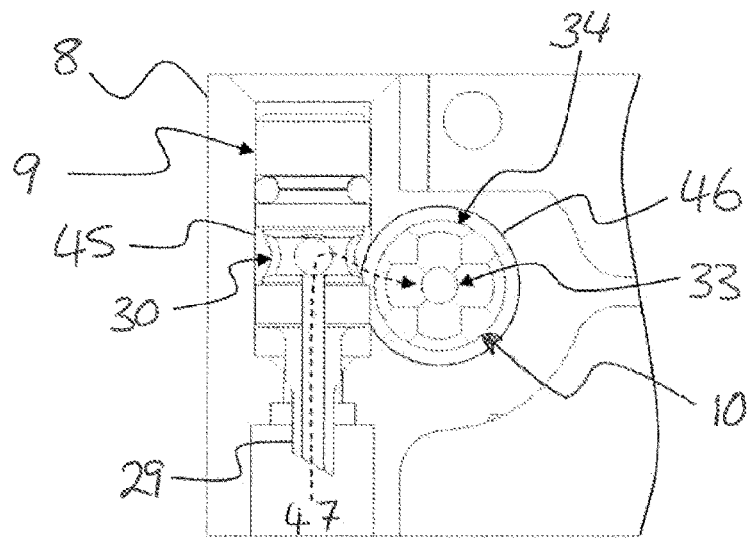
FIG. 8 is a cross-sectional of a portion of a valve block of the exemplary parachute deployment apparatus.

In FIG. 8, it may be seen that the firing pin (9) is received by a firing cavity (45) in the valve body (8). The firing cavity (45) intersects with a manifold cavity (46) in which the deployment manifold (10) is received. When the firing pin (9) is in a deployed position—as illustrated—a flow path (47) is created through the sharp tip (29), the firing pin ports (30), firing cavity (45), manifold cavity (46), manifold ports (34), and connector channel (33) to the internal cavity (25).

Figure 9:
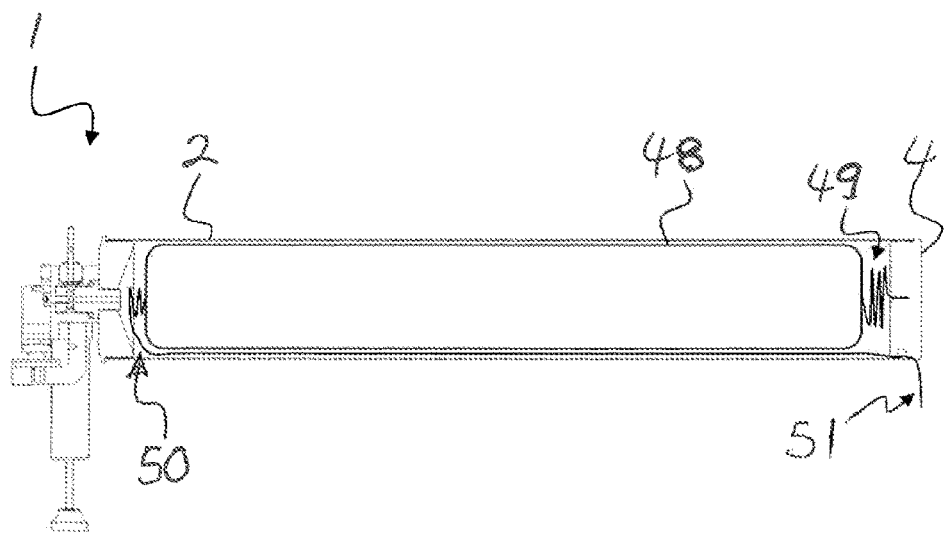
FIG. 9 is a cross-sectional side view of the exemplary parachute deployment apparatus showing the parachute contained within the internal cavity of the deployment body prior to deployment.

FIG. 9 illustrates a parachute (48) packed into the internal cavity of the body (2) of the parachute deployment apparatus (1). An apex of the parachute (48) is attached to a 1 meter long leader string (49) secured to the cap (4), while suspension lines (50) are attached to a cable (51) passing between the cap (4) and the body (2), and in turn secured to the airframe of an aircraft.

Figure 10A:
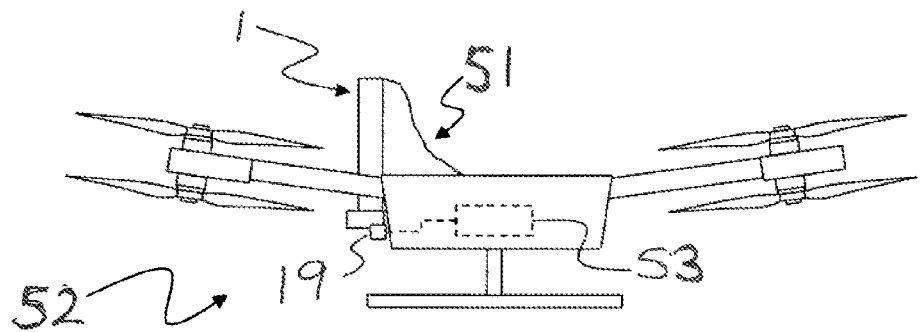
FIG. 10A shows an exemplary unmanned aerial vehicle with the exemplary parachute deployment apparatus in an un-deployed state.

For example, in FIG. 10A the parachute deployment apparatus (1) is secured to a multirotor UAV (52) in an "X8" configuration. The cable (51) is secured to a top surface of the UAV (52), while the servomechanism (19) is in communication with an on-board controller (53). The controller (53) is in communication with sensors (whether integrated or standalone) for detecting operational conditions—for example tilt.

Figure 10B:
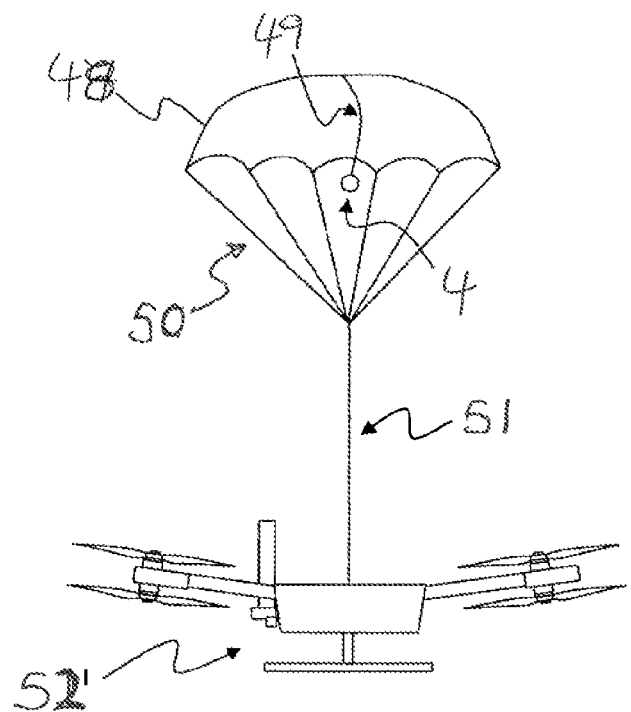
FIG. 10B shows the unmanned aerial vehicle with the exemplary parachute deployment apparatus deployed.

FIG. 10B illustrates the parachute deployment system after deployment of the parachute (48). The cable (51) extends upwards from the top surface of the UAV (52), branches out into the suspension lines (50) before connecting to the parachute (48). The leader string (49) can be seen hanging down from the top of the parachute (48) still connected to the cap (4).

Figure 11:
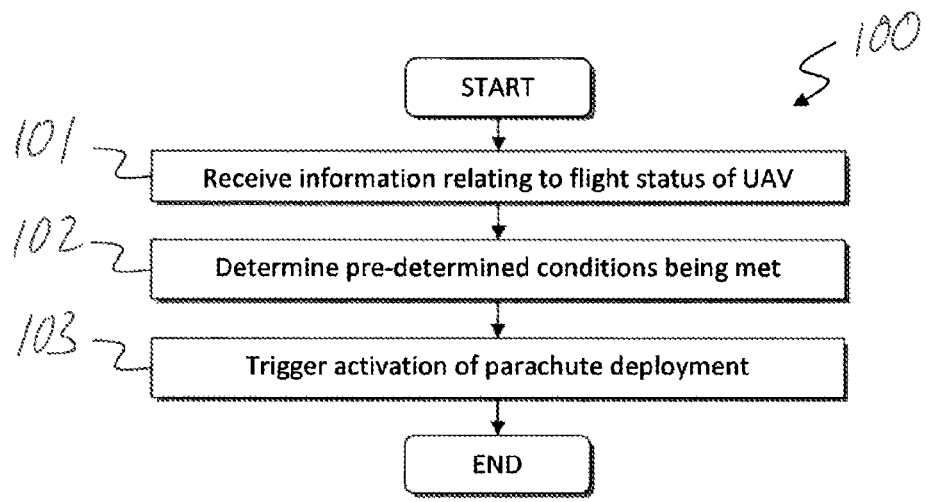
FIG. 11 is a flow diagram illustrating an exemplary method of operating the exemplary parachute deployment apparatus.

FIG. 11 illustrates a method (100) of operating the parachute deployment apparatus (1), with reference to FIG. 10A and FIG. 10B. Prior to operating the UAV (52), the parachute deployment apparatus (1) is armed by pulling back knob (17) and spring connector rod (14) allowing the trigger arm (18) to engage with the groove (41) of the hammer pin (13) to establish a locked, armed position. The gas canister (6) is screwed into the valve block (8).

Flight of the UAV (52) commences, avoiding lateral movement during the initial take off stage (for example, up to 8 meters, which reflects the altitude at which the deployment system becomes useable).

In step 101 the controller (53) receives information relating to flight status of the UAV (52)—for example indicators of pitch and roll. This information is compared against pre-determined conditions established for the UAV (52) against its known performance characteristics, where those pre-determined conditions are indicative of an emergency condition requiring parachute deployment. On determining that the pre-determined conditions are met—and therefore that an emergency condition is occurring—in step 102, in step 103 the controller (53) transmits a signal to the servo-mechanism (19) via the signal pathway (21).

The firing mechanism (7) causes pressurization of the internal cavity (25) of the deployment body (2). The cap (4) is ejected by the sudden pressure build up in the internal cavity (25) and deployment of the parachute (48) occurs through the upper opening (3) of the body (2). The cap (4) draws the parachute (48) out to its full length, increasing the likelihood of the parachute (48) catching and opening fully.

It should be appreciated that while parachute deployment is described as being initiated by the flight controller, this is not intended to be limiting. For example, deployment may be initiated on a user's instructions, or on detection of pre-determined conditions by a dedicated parachute controller.

Figure 12:
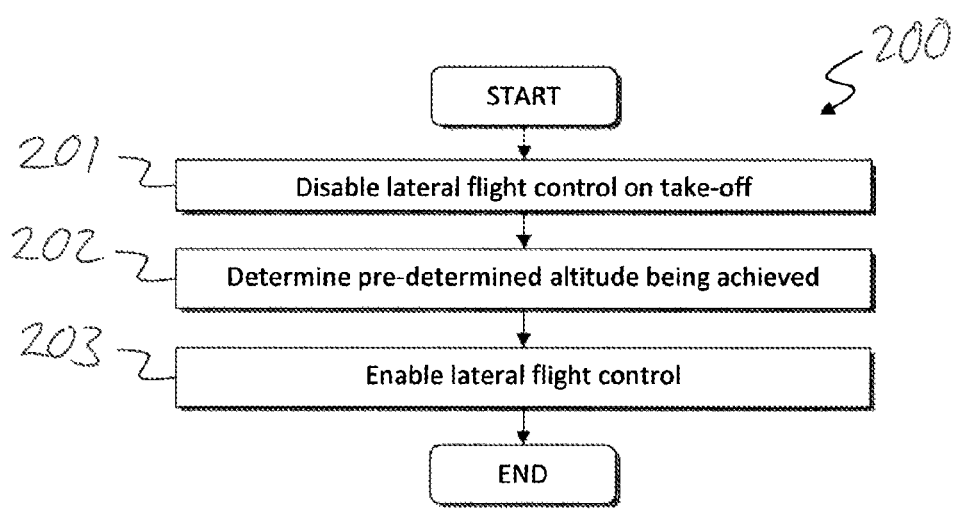
FIG. 12 is a flow diagram illustrating an exemplary method of operating the exemplary unmanned aerial vehicle.

FIG. 12 illustrates a method (200) of controlling a UAV (52) during takeoff in order to improve the likelihood of parachute deployment occurring effectively. In step 201, the controller (53) disables lateral—i.e. sideways—flight control, only permitting vertical take-off. In step 202, on determining that a pre-determined altitude has been achieved at which parachute deployment is likely to be effective—for example, 8 meters—the controller (53) may enable lateral flight control in step 203.

Reference to any prior art in this specification is not, and should not be taken as, an acknowledgement or any form of suggestion that that prior art forms part of the common general knowledge in the field of endeavor in any country in the world.

The disclosure may also be said broadly to consist in the parts, elements and features referred to or indicated in the specification of the application, individually or collectively, in any or all combinations of two or more of said parts, elements or features.

Wherein the foregoing description reference has been made to integers or components having known equivalents thereof, those integers are herein incorporated as if individually set forth.

It should be noted that various changes and modifications to the embodiments described herein will be apparent to those skilled in the art. Such changes and modifications may be made without departing from the spirit and scope of the disclosure and without diminishing its attendant utilitarian value. It is therefore intended that such changes and modifications be comprised within the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise.

Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

The invention claimed is:

1. A parachute deployment apparatus for use with an aircraft, the apparatus comprising:
    a deployment body including an elongate internal cavity having an upper opening at a first end and a base portion at a second end distal from the first end, the deployment body configured to house a parachute within the internal cavity to be deployed through the upper opening of the internal cavity;
    a gas canister storing a pressurized gas;
    a firing mechanism configured to pierce the gas canister on receiving a signal indicating a pre-defined condition has been met, wherein piercing the gas canister releases the pressurized gas into the internal cavity of the deployment body through the base portion, wherein the firing mechanism comprises:
        a firing pin;
        an activation means configured to drive the firing pin to pierce the gas canister when released from an armed position;
        a trigger configured to releasably maintain the activation means in the armed position; and
        an actuator configured to actuate the trigger to release the activation means from the armed position on receiving the signal indicating the pre-defined condition has been met; and
    a cap configured to frictionally engage with the deployment body in or across the upper opening to close the upper opening prior to deployment, and wherein the cap is configured to be projected from the upper opening upon release of the pressurized gas into the internal cavity of the deployment body to pressurize the internal cavity and act against the cap, and
    wherein the cap is connected to the parachute.

2. The parachute deployment apparatus as claimed in claim 1 wherein the deployment body has an elongate length at least four times an internal diameter of the deployment body.

3. The parachute deployment apparatus as claimed in claim 1 wherein the deployment body has an elongate length between 150 to 500 mm.

4. The parachute deployment apparatus of claim 1, wherein the base portion houses a channel in a centralized position on the base portion, wherein the channel, or a connector-channel within the channel, has a diameter between 1 to 5 mm.

5. The parachute deployment apparatus as claimed in claim 4 wherein the base portion is configured to have a conical surface.

6. The parachute deployment apparatus as claimed in claim 5 wherein the channel is located in a centralized portion of the conical surface of the base portion, and extends through the base portion.

7. The parachute deployment apparatus as claimed in claim 4 wherein the channel is configured to house a deployment manifold, which in turn, houses the connector-channel.

8. The parachute deployment apparatus as claimed in claim 1 wherein the internal diameter of the internal cavity of the deployment body between the first end and the second end is between 20 to 150 mm.

9. The parachute deployment apparatus as claimed in claim 1 wherein the cap weighs between 10 to 50 grams.

10. A parachute deployment system comprising a parachute deployment apparatus claimed in claim 1, and a controller configured to:
    determine the occurrence of pre-defined conditions; and
    activate the firing mechanism of the parachute deployment apparatus.

11. A method of deployment of a parachute deployment system as claimed in claim 10 on an aircraft, wherein the method of deployment comprises:

determining at least one pre-determined condition being met; and controlling the firing mechanism to initiate deployment of the parachute from the parachute deployment apparatus.

12. The method of deployment as claimed in claim 11 wherein the aircraft is an unmanned aircraft vehicle.

13. A method of deployment of a parachute deployment system as claimed in claim 10 on an aircraft wherein the method of deployment comprises:

pre-defining one or more conditions, which if one or more conditions is met, initiates release of the trigger of the firing mechanism;

prior to launch of the aircraft, engaging the trigger to be releasable upon the one or more pre-defined condition being met during flight of the aircraft;

upon at least one of the one or more pre-defined conditions being met, automatically releasing the trigger to initiate deployment of the parachute from the parachute deployment apparatus.

14. An unmanned aircraft vehicle comprising the parachute deployment system as claimed in claim 1, wherein the parachute deployment system is attached to a surface of the unmanned aircraft vehicle.

* * * * *